(12) United States Patent
Loof

(10) Patent No.: US 9,541,127 B1
(45) Date of Patent: Jan. 10, 2017

(54) SPHERICAL ROLLER BEARING

(71) Applicant: Marcus Loof, Nol (SE)

(72) Inventor: Marcus Loof, Nol (SE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/078,320

(22) Filed: Mar. 23, 2016

(51) Int. Cl.
F16C 33/66 (2006.01)
F16C 19/38 (2006.01)
F16C 33/48 (2006.01)
F16C 33/30 (2006.01)
F16C 23/08 (2006.01)

(52) U.S. Cl.
CPC ............. *F16C 19/381* (2013.01); *F16C 33/30* (2013.01); *F16C 33/48* (2013.01); *F16C 23/086* (2013.01); *F16C 33/6659* (2013.01); *F16C 2220/00* (2013.01)

(58) Field of Classification Search
CPC ......... F16C 23/086; F16C 19/38; F16C 33/36; F16C 33/48; F16C 33/6681
See application file for complete search history.

(56) References Cited

U.S. PATENT DOCUMENTS 2,740,675 A * 4/1956 Palmgren .............. F16C 23/086
384/564
3,547,504 A * 12/1970 Cedler .................... F16C 19/38
384/558
6,152,606 A * 11/2000 Shirosaki .............. F16C 23/086
384/475
6,296,395 B1 * 10/2001 Brand .................... F16C 23/086
384/558
8,591,119 B2 * 11/2013 Keller .................... F16C 23/086
384/551

FOREIGN PATENT DOCUMENTS

DE 102012219512 A1 * 4/2014 .......... F16C 33/6681

* cited by examiner

Primary Examiner — Thomas R. Hannon
(74) Attorney, Agent, or Firm — Bryan Peckjian; SKF USA Inc. Patent Dept.

(57) ABSTRACT

A spherical roller bearing having an axially extending center axis with an outer ring, an inner ring arranged concentrically with the outer ring, a guide ring arranged concentrically with the inner ring and the outer ring, wherein the guide ring has a tapering radial cross-section, one set of cambered rollers on either side of the guide ring and a cage structure arranged to retain the two sets of cambered rollers. The guide ring having two circumferential guide ring sections, an inner guide ring section proximal to the inner ring and an outer guide ring section distal to the inner ring. At least one through-opening extends between two lateral surfaces of the guide ring. The at least one through-opening is arranged in the inner guide ring section and the cambered rollers of each set are distanced from the inner guide ring section and in contact with the outer guide ring section.

17 Claims, 4 Drawing Sheets

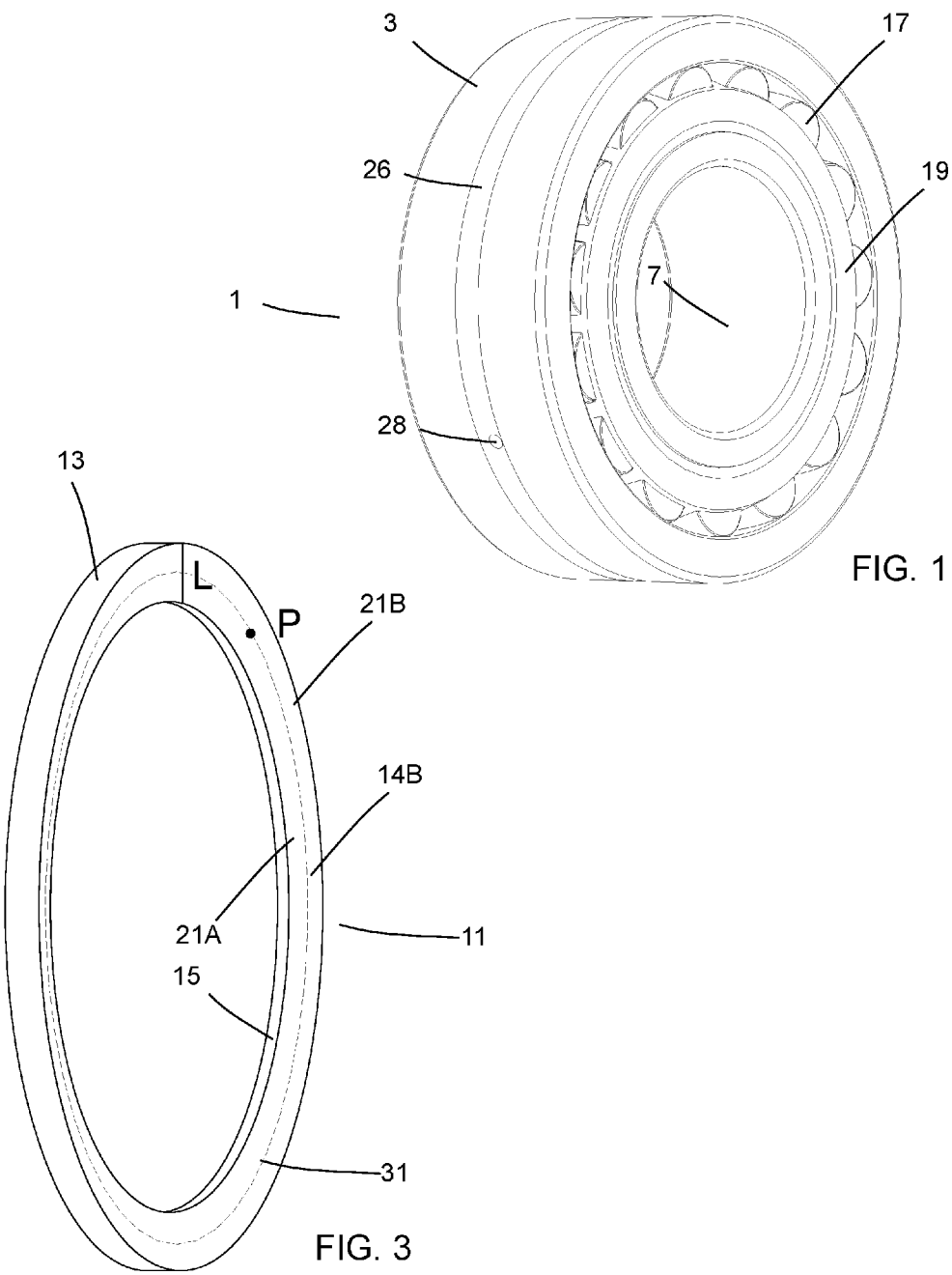

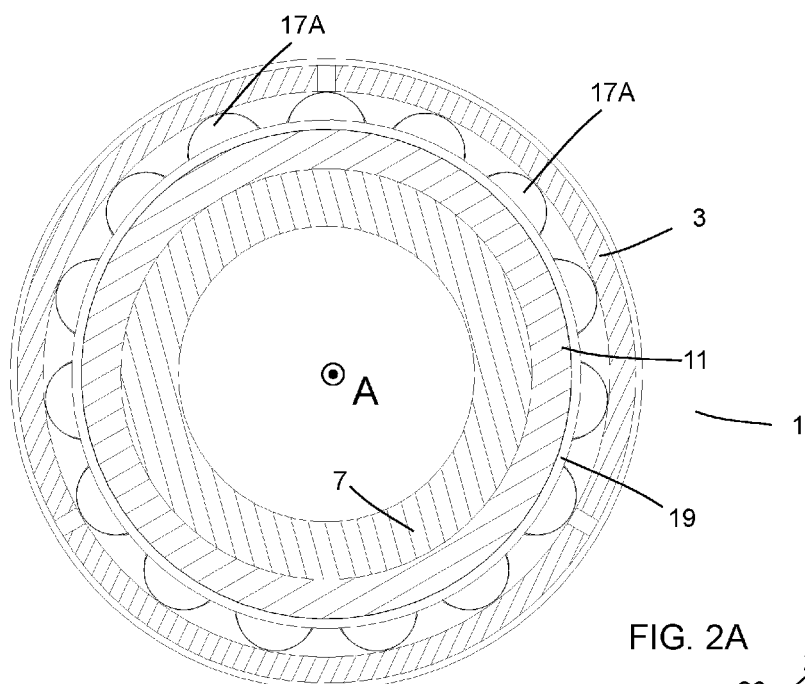
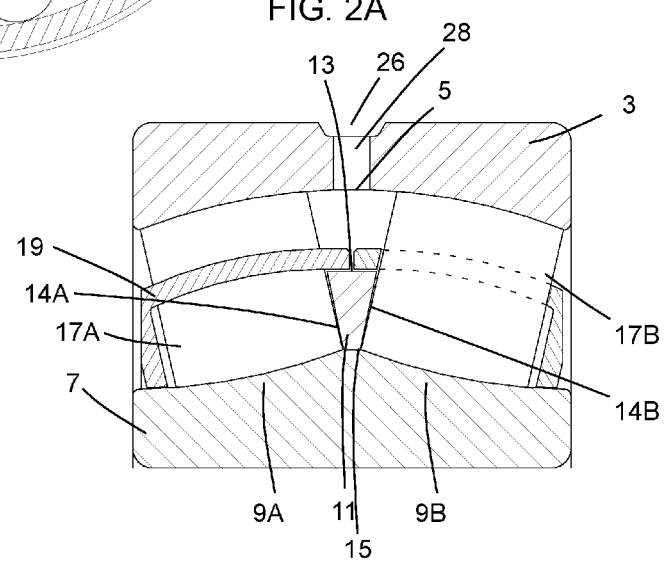
FIG. 2B

SPHERICAL ROLLER BEARING

TECHNICAL FIELD

On a general level, the present invention relates to a spherical roller bearing with improved properties.

BACKGROUND OF THE INVENTION

Spherical roller bearings are designed to accommodate heavy radial and axial loads. Structurally, they typically have an outer ring, an inner ring and, between these, there are two rows of oppositely arranged rolling elements that are separated by and interacting with a guide ring, also called centering ring or spacer, so as to optimally distribute the load.

Various tribological components of spherical roller bearings, including the aforementioned, are usually exposed to substantial heat generation and friction, and, eventually, wear. In order to alleviate consequences of this exposure, various coolants and lubricants are applied. In certain applications, such as gear boxes, a single substance, typically suitable oil, is used both for cooling and lubrication. Oil is splashed or flushed through the application and subsequently cooled, either internally or in an external heat exchanger. In this context and as is known in the art, spherical roller bearings are on a general level very compactly designed in order to maximize the number of rolling elements used. Hence, achieving that the coolant/lubricant is sufficiently spread throughout the bearing is associated with considerable difficulties. In addition, the guide ring acts as a barrier between the two rows of rolling elements and prevents fluid passage across the guide ring.

DE102012219512 discloses a spherical roller bearing with a perforated guide ring extending between the rotatable outer ring and the fixed inner ring. DE102012219512 presents a bearing for use in so called vibrating screen applications. Vibrating screens are vibrating sieving devices that separate solids from crushed material in technology fields such as mineral processing, mining and quarry.

Cross-section of the guide ring has the shape of a trapezoid. A plurality of transit channels is arranged in the guide ring. The transit channels prevent inadvertent accumulation of oil in the bearing and reduce back-pressure on both sides of the guide ring. As it may be seen, the portion of the guide ring having the transit channels provides the contact surface for the rolling element.

On a general level, interior of the spherical roller bearing is a rather extreme environment. For instance, the guide ring must withstand elevated pressures due to its contact with an end of the rolling element. On this background and for maximal structural stability, components of the roller bearing are typically made in wear-resistant materials and without dents, cavities and/or perforations.

Accordingly, it is desirable that the portion of the guide ring brought in contact with the rolling elements is devoid of structural weakenings, such as the transit channels disclosed in DE102012219512. Otherwise, this structural weakening must be compensated, by way of example by adding more material and/or by using more advanced materials.

An objective of the present invention is therefore to provide a spherical roller bearing not ridden with drawbacks that are associated with spherical roller bearings belonging to the prior art. A further objective is to provide an improved spherical roller with the components manufactured using standard production processes. Here, improvement of the properties of the production process, e.g. achieving material savings, is a further objective of the present invention.

SUMMARY OF THE INVENTION

The above stated objectives are achieved by means of a spherical roller bearing according to the independent claim.

Accordingly, a spherical roller bearing has an axially extending center axis and provides an outer ring comprising an outer race, an inner ring arranged concentrically with the outer ring and comprising two inner races, a guide ring arranged concentrically with the inner ring and the outer ring, wherein the guide ring has an outer base surface facing the outer ring, an inner base surface facing the inner ring and two lateral surfaces extending between the outer base surface and the inner base surface, and wherein the distance in the axial direction between the two lateral surfaces decreases from the outer base surface towards the inner base surface. The spherical roller bearing further provides one set of cambered rollers on either side of the guide ring such that each set of rollers is associated with one inner race, a cage structure arranged to retain the two sets of cambered rollers, wherein the guide ring provides two circumferential guide ring sections, an inner guide ring section being proximal to the inner ring and extending in the radial direction between the inner base surface and a predetermined point arranged between the outer base surface and the inner base surface, an outer guide ring section being distal to the inner ring and extending in the radial direction between the predetermined point and the outer base surface. At least one through-opening that extends between the two lateral surfaces is provided in the guide ring, the at least one through-opening being arranged in the inner guide ring section, wherein the cambered rollers of each set are distanced from the inner guide ring section and in contact with the outer guide ring section.

In the following, positive effects and advantages of the invention at hand are presented.

The present invention is for one part based on the understanding that if the cooling/lubricating fluid was able to flow across the barrier in the shape of the guide ring, then the efficiency of the cooling/lubricating process could be improved.

In addition, the present invention is based on the insight that the rollers of an operating spherical roller bearing behave in a rather particular manner. More specifically, for a guide ring of the above-described type the roller end will not contact the entire lateral surface of the guide ring it faces. Rather, the rollers are distanced from the inner guide ring section and in contact with the outer guide ring section. This applies to a roller in initial position, when the entire bearing is at rest, as well as for the roller that, in consequence of the roller being set in motion, deviates from the initial position, i.e. either a positive or a negative roller skew is present. Now and rather counterintuitively, if the roller skew is present in a guide ring of the above-described type, the contact surface between a skewed roller and the lateral surface of the guide ring will always move radially outwards, i.e. towards the outer ring, as compared with the contact surface of the roller in its initial position. This is true regardless of the direction of the roller skew. Accordingly, the inner ring has the proximal, inner guide ring section that isn't brought in contact with the roller. By arranging at least one through-opening that extends between the two lateral surfaces of the guide ring in the inner guide ring section, it is ensured that the coolant/lubricant may pass through the guide ring. This improves the cooling/lubricating effect in the bearing without adversely affecting structural properties of the guide ring, as is the case with the prior art.

Furthermore and as is known in the art, most heat and wear in the spherical roller bearing is generated in proximity of the two inner races of the inner ring. Arranging the at least one through-opening in the inner guide ring section, i.e. close to these races, entails that larger quantities of the coolant/lubricant may reach the races, resulting in their improved cooling/lubrication.

Finally, by arranging the at least one through-opening, the weight of the guide ring may be reduced and more cost-efficient manufacturing process may be achieved.

Different embodiments of the invention are disclosed in the dependent claims and in the detailed description.

BRIEF DESCRIPTION OF THE DRAWINGS

FIG. 1 is a perspective side view of a spherical roller bearing according to one embodiment of the present invention.

FIG. 2A is a radial cross-sectional view of a spherical roller bearing according to one embodiment of the present invention.

FIG. 2B is an axial cross-sectional view of the spherical roller bearing of FIG. 2A.

FIG. 3 is a perspective view of a guide ring with a circumferential line provided on a lateral surface of the guide ring.

Figure 4A:
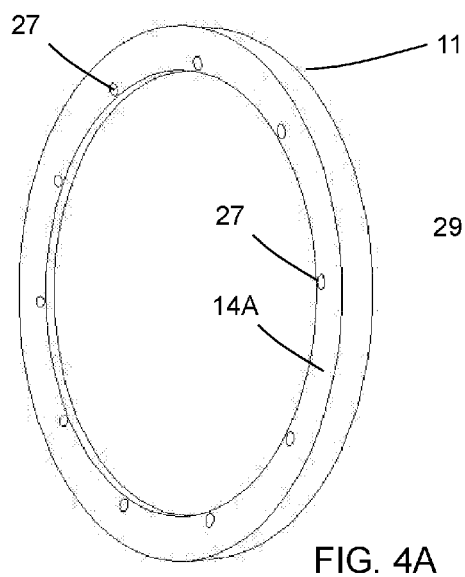
FIGS. 4A-4D are perspective views of guide ring being part of the spherical roller bearing according to one embodiment of the present invention.

Further advantages and features of embodiments will become apparent when reading the following detailed description in conjunction with the drawings.

DETAILED DESCRIPTION OF THE INVENTION

The present invention will now be described more fully hereinafter with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIG. 1 is a perspective side view of a spherical roller bearing 1 according to one embodiment of the present invention. Owing to their reliability, the spherical roller bearings have found wide industrial. They are most suitable for applications characterized by heavy loads and moderate speeds, such as wind turbines, pulp and paper processing equipment and gear boxes.

As it may be seen, the shown spherical roller bearing 1 is substantially cylindrically shaped. An outer ring 3, a full set of cambered rollers 17, a cage structure 19 that retains the shown set of cambered rollers 17 and an inner ring 7 arranged concentrically with the outer ring 3 are visible in FIG. 1. A lubrication groove 26 and a lubrication inlet 28 may also be seen. These and other components of the spherical roller bearing 1, in particular those not visible in FIG. 1, will be shown and discussed in greater detail in connection with other Figs.

FIG. 2A is a radial cross-sectional view of a spherical roller bearing 1 according to one embodiment of the present invention. Here, the spherical roller bearing 1 has an axially extending center axis (A) that is perpendicular to the plane of the paper. As stated in connection with FIG. 1, the spherical roller bearing 1 provides an outer ring 3, an inner ring 7 arranged concentrically with the outer ring 3, a guide ring 11 arranged between the inner ring 7 and the outer ring 3 and being concentric with these. The bearing 1 further provides one set of cambered rollers on either side of the guide ring (only one of these sets 17A being visible in FIG. 2A) and a cage structure 19 arranged to retain the cambered rollers 17A.

FIG. 2B is an axial cross-sectional view of the spherical roller bearing 1 of FIG. 2A. In addition to what has been disclosed in connection with FIG. 2A, the outer ring 3 provides an outer race 5 that faces the inner ring 7. The inner ring 7 provides two inner races 9A, 9B facing the outer race 5. Furthermore, a guide ring 11 has an outer base surface 13 facing the outer ring 3, an inner base surface 15 facing the inner ring 7 and two lateral surfaces 14A, 14B extending between the outer base surface 13 and the inner base surface 15, wherein the distance in the axial direction between the two lateral surfaces 14A, 14B decreases from the outer base surface 15 towards the inner base surface 13. One set of cambered rollers 17A, 17B is on either side of the guide ring 11 such that each set of rollers is associated with one inner race 9A, 9B. The rollers 17A, 17B are in their initial position, hence inclined at an angle with respect to the center axis (A). The rollers 17A, 17B may skew away from their initial position in order to accommodate the imposed load. A cage structure 19 is arranged to retain rollers 17A, 17B. Previously mentioned lubrication groove 26 and lubrication inlet 28 may also be seen.

FIG. 3 is a perspective view of a guide ring 11 with a continuously tapering radial cross-section and having a circumferential line 31 provided on a lateral surface 14B of the guide ring 11. This circumferential line 31 separates two circumferential guide ring sections 21A, 21B of the guide ring 11. More specifically, the guide ring 11 provides an inner guide ring section 21A being proximal to the inner ring (not shown in FIG. 3) and extending in the radial direction between the inner base surface 15 and a predetermined point P arranged between the outer base surface 13 and the inner base surface 15. In FIG. 3, the predetermined point P is arranged on the circumferential line 31. In one embodiment, the predetermined point P is arranged at the midpoint between the outer base surface 13 and the inner base surface 15 of the guide ring 11. In another embodiment, where L is the total distance between the inner base surface 13 and the outer base surface 15 of the guide ring 11, the predetermined point P is located at a position equal to or more than 0.4 L from the inner base surface and equal to or less than 0.6 L from the inner base surface. Preferably the predetermined point P is located at a position equal to 0.5 L from the inner base surface. Generally, the size of the interval containing the predetermined point P may vary greatly as a function of the intended field of application. The guide ring 11 further provides an outer guide ring section 21B being distal to the inner ring and extending in the radial direction between the predetermined point P and the outer base surface 15. Once the spherical roller bearing is fully assembled and the rollers (not shown in FIG. 3) are in their initial position, the rollers are distanced from the inner guide ring section 21A and in contact with the outer guide ring section 21B, the contact zone being delimited by the circumferential line 31. As argued above, if the roller skew is present, the contact surface between a skewed roller and the lateral surface of the guide ring 14B will always move radially outwards, i.e. towards the outer base surface 13, as compared with the contact surface of the roller in its initial position. This is true regardless of the direction of the roller skew.

The invention at hand leverages the above insight. In particular, at least one through-opening (not shown in FIG. 3) extending between the two lateral surfaces 14A-not visible and 14B of the guide ring 11 may be arranged in the inner guide ring section 21A. Hereby, it is ensured that the coolant/lubricant may even pass through the guide ring 11. This improves the cooling/lubricating effect in the bearing without adversely affecting structural properties of the guide ring 11, as is the case with the prior art.

Figure 4B:
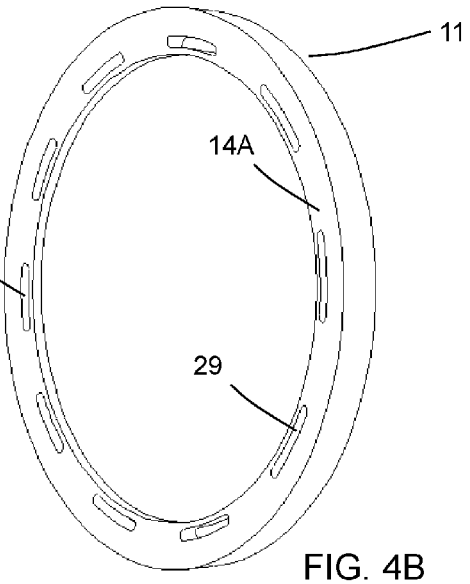
Figure 4C:
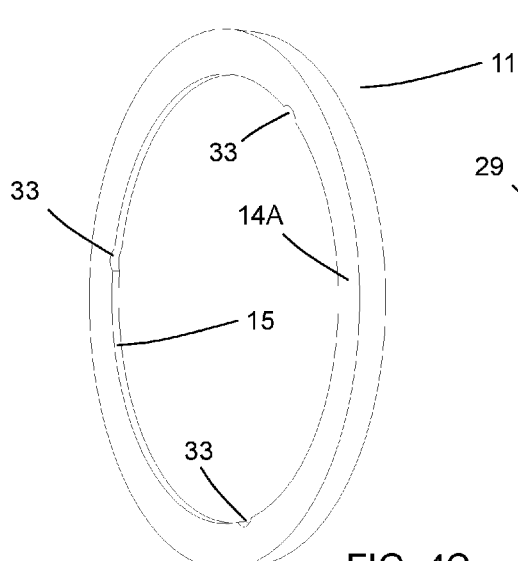
Figure 4D:
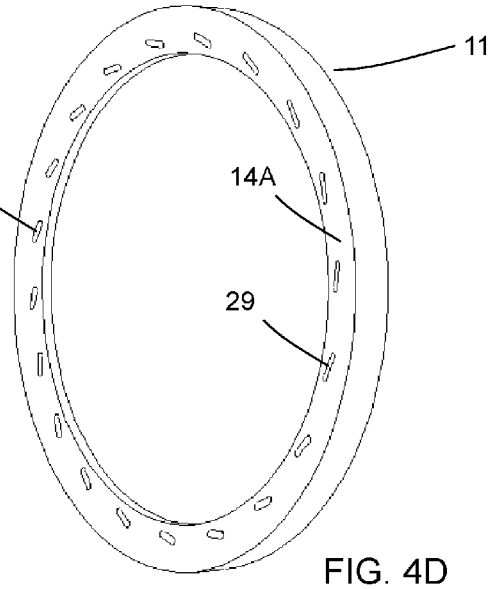

FIGS. 4A-4D are perspective views of guide ring 11 being part of the spherical roller bearing according to one embodiment of the present invention. As it may be seen, the through-opening may be realized in different ways. Typically, the through opening extends in parallel with the axis (A). FIGS. 4A-4D show a guide ring 11 where the inner guide ring section is provided with an array of circumferentially extending, uniformly distributed through-openings. More specifically, the through-openings in FIG. 4A are cylindrical holes 27. The through openings in FIGS. 4B and 4D are slots 29. Here, slots 29 of FIG. 4B are arranged in parallel with a circumferential line, such as the circumferential line shown and discussed in FIG. 3, provided on a lateral surface 14A of the guide ring 11. Slots 29 of FIG. 4D are arranged inclined with respect to the circumferential line. The through-openings of FIG. 4C are grooves 33 arranged in the inner base surface 15 of the guide ring 11. This design is particularly advantageous when the guide ring 11 rests against the inner ring (not shown in FIGS. 4A-4D), more precisely against a central shoulder of the inner ring. This will be discussed in greater detail in connection with FIG. 5.

All shown guide ring designs may be manufactured using standard production processes, such as sintering or turning. In particular, sintering offers numerous benefits, e.g. a simple process since the openings are made in the same working moment as the ring itself, material savings, or the through-openings acting as tolerance buffers that absorb deviations that appear in the production process. Obviously and regardless of the production process employed, the resulting guide ring will have reduced weight compared to a non-perforated guide ring of same size. Here, it is equally conceivable to arrange more than one type of the above-discussed through-openings in the inner section of the guide ring.

Figure 5:
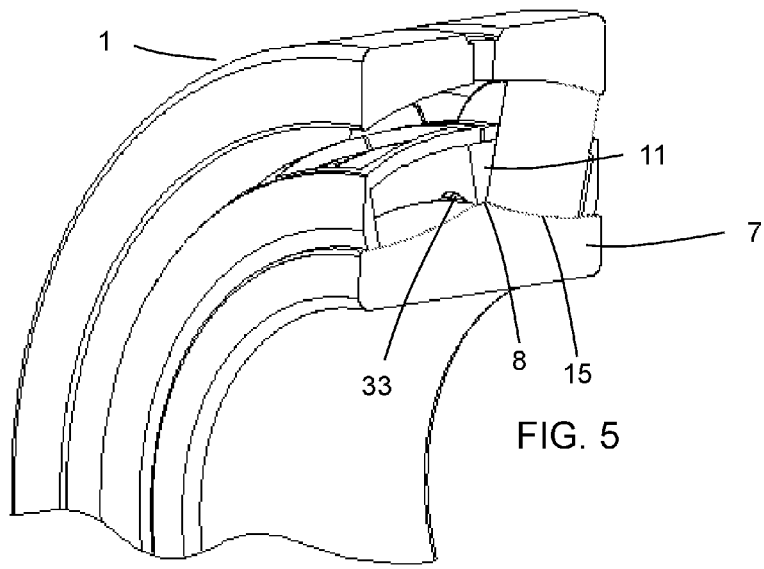
FIG. 5 is an axial cross-sectional view of a part of the spherical roller bearing of the present invention where the guide ring circumferentially abuts the inner ring.

FIG. 5 is an axial cross-sectional view of a part of the spherical roller bearing 1 of the present invention where the guide ring 11 circumferentially abuts the inner ring 7. This provides additional stability for the guide ring 11. However, this contact entails an increased friction between the guide ring 11 and a shoulder 8 of the inner ring. One way to address this is to ensure sufficient lubrication of the contact surface. As a conventional guide ring is very compact, it is difficult for the lubricant to penetrate and subsequently lubricate the contact surface. This problem may be solved by using the guide ring 11 shown in FIG. 4C—the through-openings are grooves 33 arranged in the inner base surface 15 of the guide ring such that the lubricant may reach between the inner base surface 15 of the guide ring and the shoulder 8 of the inner ring.

Figure 6:
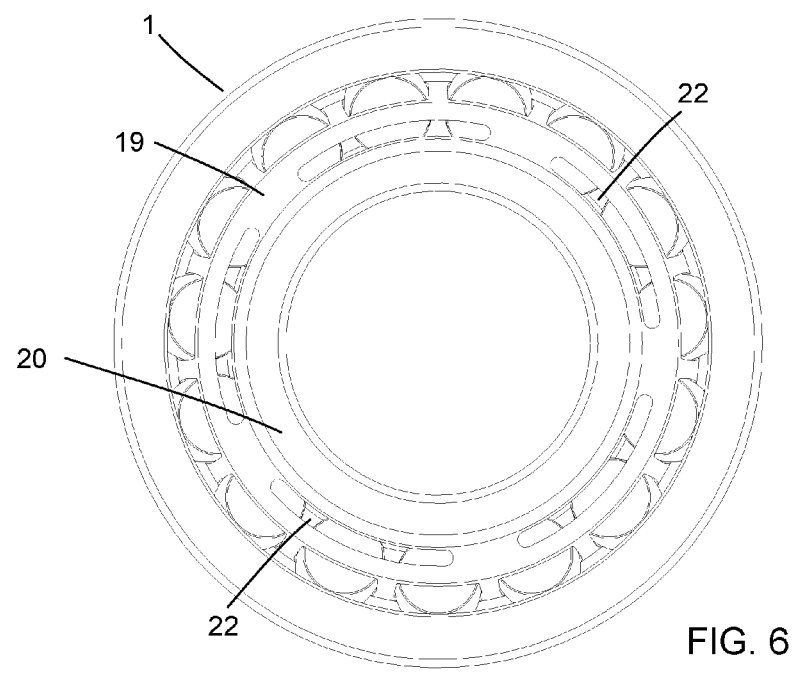
FIG. 6 is a radial cross-sectional view of a spherical roller bearing with a cage structure according to one embodiment of the present invention.

FIG. 6 is a radial cross-sectional view of a spherical roller bearing 1 with a cage structure 19 according to one embodiment of the present invention. This view is similar to that of FIG. 1. The cage structure 19 extends circumferentially and has at least one lateral surface 20. The lateral surface 20 is provided with a plurality of through-openings. Although not visible in FIG. 6, the through-openings of the inner guide ring section and of the circumferentially-extending cage structure 19 are of similar shapes. In this context, it has been established that the flow efficiency of the coolant/lubricant is further enhanced if the retaining cage structure 19 of the bearing 1 is provided with additional flow channels. In the shown example, the cage structure 19 has a plurality of slots 22 extending in parallel with a circumferential line, such as the circumferential line shown and discussed in conjunction with FIG. 3. For even greater flow efficiency, the through-openings of the inner guide ring section and the through-openings, i.e. slots 22, of the circumferentially-extending cage structure 19 are at least partially aligned. In a related context, by providing the lateral surface of the cage structure 19 with a plurality of through-openings 22, the cage structure 19 itself becomes more elastic, i.e. becomes more resistant to breakage. In addition, the position and the size of the through-openings 22 could be suitably chosen so as to further improve the elasticity of the cage structure.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A spherical roller bearing having an axially extending center axis and comprising:
   an outer ring including an outer race,
   an inner ring arranged concentrically with the outer ring and providing two inner races,
   a guide ring arranged concentrically with the inner ring and the outer ring, the guide ring having an outer base surface facing the outer ring, an inner base surface facing the inner ring and two lateral surfaces extending between the outer base surface and the inner base surface, and the distance in the axial direction between the two lateral surfaces decreases from the outer base surface towards the inner base surface,
   one set of cambered rollers on either side of the guide ring such that each set of rollers is associated with one inner race, and
   a cage structure arranged to retain the two sets of cambered rollers, the guide ring providing two circumferential guide ring sections, an inner guide ring section proximal to the inner ring and extending in the radial direction between the inner base surface and a predetermined point (P) arranged between the outer base surface and the inner base surface, an outer guide ring section being distal to the inner ring and extending in the radial direction between the predetermined point (P) and the outer base surface, wherein
   at least one through-opening extending between the two lateral surfaces is provided in the guide ring, the at least one through-opening being arranged in the inner guide ring section and wherein the cambered rollers of each set are distanced from the inner guide ring section and in contact with the outer guide ring section.

2. The spherical roller bearing according to claim 1, wherein the through opening arranged in the inner guide ring section extends in parallel with the axis.

3. The spherical roller bearing according to claim 1, wherein the distance in the axial direction between the two lateral surfaces continuously decreases from the outer base surface towards the inner base surface.

4. The spherical roller bearing according to claim 1, wherein L is the total distance between the inner base surface and the outer base surface of the guide ring and the predetermined point (P) is arranged at a point positioned between 0.4 L and 0.6 L.

5. The spherical roller bearing according to claim 4, wherein the predetermined point (P) is arranged at the midpoint between the outer base surface and the inner base surface of the guide ring.

6. The spherical roller bearing according to claim 1, wherein the inner guide ring section is provided with an array of circumferentially extending, uniformly distributed through-openings.

7. The spherical roller bearing according to claim 6, wherein the array of through-openings provides at least two types of through-openings chosen from the group comprising cylindrical holes, slots and grooves arranged in the inner base surface of the guide ring.

8. The spherical roller bearing according to claim 1, wherein the through-opening is a cylindrical hole.

9. The spherical roller bearing according to any of the claim 1, wherein the through-opening is a slot.

10. The spherical roller bearing according to claim 9, wherein the slot is arranged in parallel with a circumferential line provided on any of the lateral surfaces of the guide ring.

11. The spherical roller bearing according to claim 9, wherein the slot is arranged inclined with respect to a circumferential line provided on any of the lateral surfaces of the guide ring.

12. The spherical roller bearing according to claim 1, wherein the through-opening is a groove arranged in the inner base surface of the guide ring.

13. The spherical roller bearing according to claim 1, wherein the cage structure extends circumferentially and has at least one lateral surface, wherein the lateral surface is provided with at least one through-opening and the through-openings of the inner guide ring section and of the circumferentially-extending cage structure are of similar shapes.

14. The spherical roller bearing according to claim 13, wherein the through-openings of the inner guide ring section and the through-openings of the circumferentially-extending cage structure are at least partially aligned.

15. The spherical roller bearing according to claim 1, wherein the guide ring is manufactured using sintering or turning.

16. The spherical roller bearing according to claim 1, wherein the guide ring circumferentially abuts the inner ring.

17. The spherical roller bearing according to claim 1, wherein the inner ring is rotatable and the outer ring is fixed.

\* \* \* \* \*